(12) United States Patent
Akagawa et al.

(10) Patent No.: US 7,921,093 B2
(45) Date of Patent: Apr. 5, 2011

(54) INFORMATION PROCESSING APPARATUS AND INFORMATION PROCESSING METHOD

(75) Inventors: Etsutaro Akagawa, Kawasaki (JP); Yohsuke Ishii, Yokohama (JP); Koji Sonoda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 561 days.

(21) Appl. No.: 11/969,291

(22) Filed: Jan. 4, 2008

(65) Prior Publication Data
US 2008/0294704 A1    Nov. 27, 2008

(30) Foreign Application Priority Data
May 25, 2007 (JP) ................................ 2007-138931

(51) Int. Cl.
*G06F 17/00* (2006.01)
(52) U.S. Cl. ........................................ 707/705; 711/162
(58) Field of Classification Search .................. 707/705; 711/162
See application file for complete search history.

(56) References Cited

U.S. PATENT DOCUMENTS
5,150,473 A * 9/1992 Zulch ............................ 711/162

FOREIGN PATENT DOCUMENTS
JP    2006-323999    11/2006

* cited by examiner

*Primary Examiner* — Charles Rones
*Assistant Examiner* — Belix M Ortiz
(74) *Attorney, Agent, or Firm* — Brundidge & Stanger, P.C.

(57) ABSTRACT

Providing an information processing apparatus and information processing method that prevent the occurrence of inconsistencies between restored files and other files, thereby improving ease of use. When restoring a backup virtual tree, the owner of each file and directory belonging to the backup virtual tree is identified; and when it is found, based on the identification result, that the owner of any of the files or directories is not a target user and the update time and/or version of the backup file or directory is older than that of the corresponding present file or directory, the backup file or directory is restored back into a special directory accessible for the target user with the tree structure of the original virtual tree intact.

11 Claims, 17 Drawing Sheets

FIG.8

| USER NAME | ACCESS RIGHT | ... |
|---|---|---|
| user1 | read | |
| user2 | read/write | |
| user3 | read/write | |
| ... | | |

| METADATA NUMBER | ORIGINAL PATH NAME | NEW PATH NAME |
|---|---|---|
| 15 | /home/dep.3/user2/product1/file3 | /home/dep.2/user1/.restor/home/dep.3/user2/product1/file3 |
| .. | .. | .. |

100

INFORMATION PROCESSING APPARATUS AND INFORMATION PROCESSING METHOD

CROSS-REFERENCES TO RELATED APPLICATIONS

This application relates to and claims priority from Japanese Patent Application No. 2007-138931, filed on May 25, 2007, the entire disclosure of which is incorporated herein by reference.

BACKGROUND

1. Field of the Invention

The invention relates to an information processing apparatus and information processing method and is suitable for use in, for example, a storage system.

2. Description of Related Art

Conventionally, creating a file with a link to another file made public by a different user by using the link function of HTML (HyperText Markup Language) or Word (Microsoft registered trademark) is commonly performed.

When a link source file having a link to another file, such as the one described above, is backed up and later restored, the version of the link source file may be older than the version of the link destination file and so there may be an inconsistency between them. For example, there is a problem that, if the link source file and the link destination file are source codes, when the link destination file is changed due to a version change of a source program, the compiler cannot compile the source code.

To solve the above problem, when backing up a file in a file system, a file made public by a different user may also be backed up using NDMP (Network Data Management Protocol) tar commands or the technique described in JP2006-323999 A.

Note that tar commands are ordinary commands used for backing up files to tapes. JP2006-322999 A also discloses a technique for separately managing physical storage locations and logical storage locations so that users can use files without paying attention to the storage destinations of the files.

However, the following problem exists. For example, Windows (Microsoft trademark), which is broadly used as an OS (operating system) in clients, has a function called ABE (Access-Based Enumeration) for obscuring files and directories that a target user does not have access rights for when the target user access trees. As a result of this function, when using the tar commands, directories are obscured unless the target user has access rights for them, so if a public file belonging to a different user exists below the obscured directories, that file cannot be backed up.

Furthermore, with the technique described in JP2006-323999 A, there is a problem that, when a user who is accessing a logical storage location in a file attaches a link to a logical storage location in another file, the user cannot access the other file with a user program for accessing physical storage areas. This problem occurs with, for example, include of headers of program sources and images for HTMLs.

This invention has been devised in light of the above points and it is an object of this invention to provide an information processing apparatus and information processing method that prevent the occurrence of inconsistencies between restored files and other files, thereby improving ease of use.

SUMMARY

In order to achieve the above object, this invention provides an information processing apparatus including: an identification unit for identifying the owner of each file and directory belonging to a virtual tree when restoring a backup of the virtual tree, the virtual tree being a virtual file system tree composed of, from among one or more files and directories forming a file system, only the files and directories accessible for a target user; and a restoration unit for comparing, when it is found, based on the result of the identification by the identification unit, that the owner of any of the files and directories is not the target user, the update time and/or version of the backup file or directory with that of the corresponding present file or directory, and when the update time and/or version of the backup file or directory is older than that of the corresponding present file or directory, restoring the backup file or directory back into a special directory accessible by the target user while maintaining the tree structure of the original virtual tree.

Accordingly, with this information processing apparatus, regarding a file or directory that a target user does not have ownership for and that has already been updated, its backup file or directory is restored back into a special directory with its original tree structure intact. In the restored virtual tree, the access destination for that file or directory is switched from the present file or directory to the restored file or directory in the special directory, so inconsistencies between the file of the target user and the file of another user can be effectively avoided.

This invention also provides an information processing method including: a first step of identifying the owner of each file and directory belonging to a virtual tree when restoring the backup of the virtual tree, the virtual tree being a virtual file system tree composed of, from among one or more files and directories forming a file system, only the files and directories accessible for a target user; and a second step of comparing, when it is found, based on the result of the identification by the identification unit, that the owner of any of the files and directories is not the target user, the update time and/or version of the backup file or directory with that of the corresponding present file or directory, and when the update time and/or version of the backup file or directory is older than that of the corresponding present file or directory, restoring the backup file or directory back into a special directory accessible by the target user while maintaining the tree structure of the original virtual tree.

Accordingly, with this information processing method, regarding a file or directory that a target user does not have ownership for and that has already been updated, its backup file or directory is restored back into a special directory with its original tree structure intact. In the restored virtual tree, the access destination for that file or directory is switched from the present file or directory to the restored file or directory in the special directory, therefore, so inconsistencies between the file of the target user and the file of another user can be effectively avoided.

According to this invention, it is possible to realize an information processing apparatus and information processing method that prevent the occurrence of inconsistencies between restored files and other files, thereby improving ease of use.

Other aspects and advantages of the invention will be apparent from the following description and the appended claims.

BRIEF DESCRIPTION OF THE DRAWINGS

FIG. 8 is a conceptual diagram illustrating access right information.

FIG. 15 is a conceptual diagram illustrating a path mapping table.

DETAILED DESCRIPTION OF PREFERRED EMBODIMENTS

Embodiments of this invention will be described below with reference to the attached drawings.

(1) Embodiment 1

(1-1) Entire Configuration of Storage System

Figure 1:
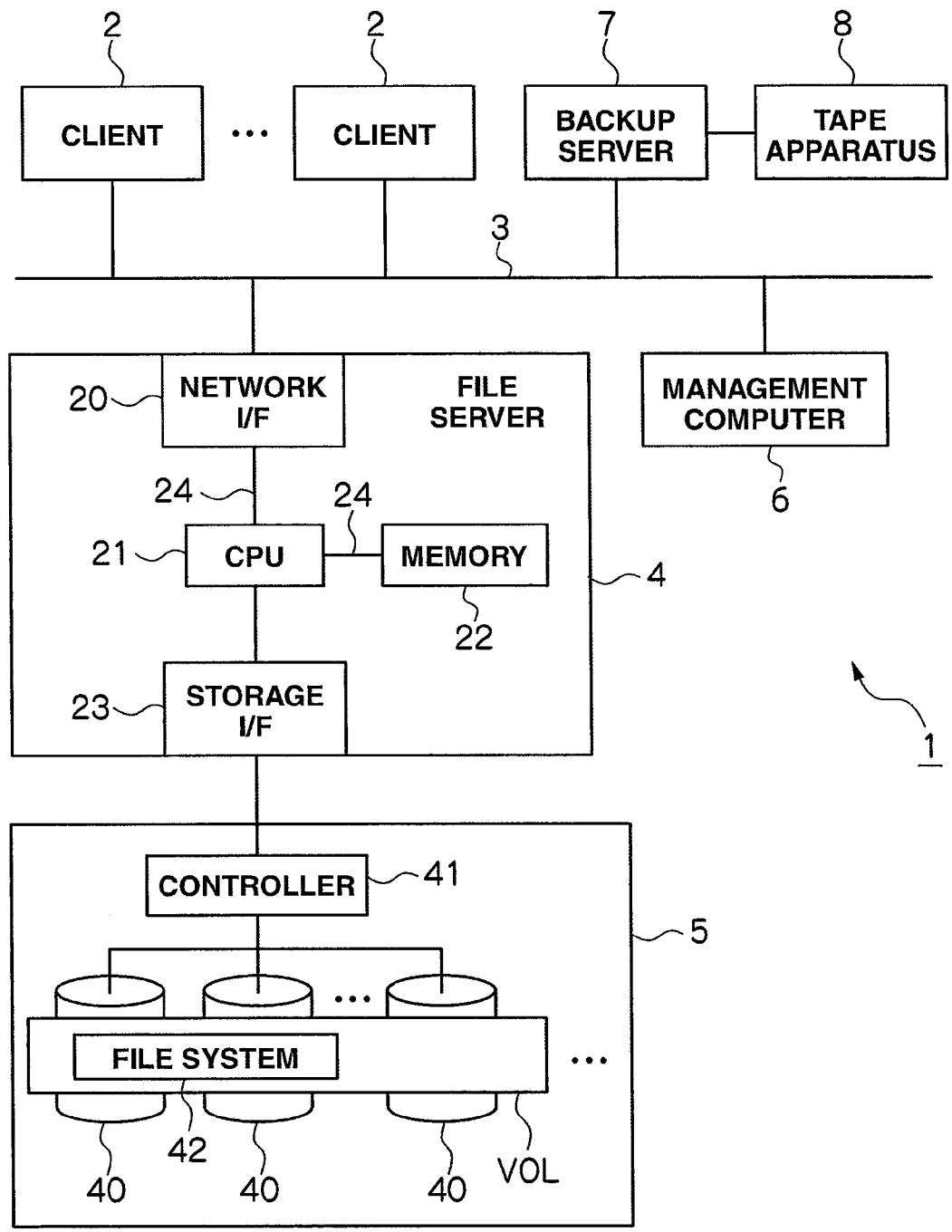
FIG. 1 is a block diagram showing the configuration of a storage system according to Embodiment 1.

FIG. 1 shows an entire storage system according to Embodiment 1. In this storage system 1, one or more clients 2 are connected to a file server 4 via a network 3, the file server 4 also being connected to a storage subsystem 5. A management computer 6 and a backup server 7 are also connected to the network 3 and the backup server 7 is also connected to a tape apparatus 8.

Figure 2:
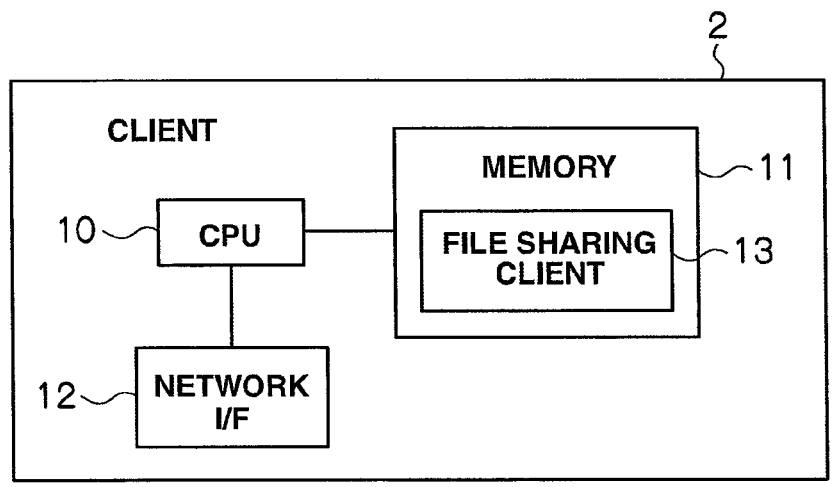
FIG. 2 is a block diagram showing the outline configuration of a client.

Clients 2 are terminals for users to make file access requests to the server 4 and they are, for example, personal computers, work stations, or mainframes. As shown in FIG. 2, each client 2 is composed of information processing resources such as a CPU (Central Processing Unit) 10, a memory 11, and a network interface 12.

The memory 11 stores a file sharing client 13 as a control program and the CPU 10 runs this file sharing client 13 so that the clients 2 can access files stored in the storage subsystem 5. The network interface 20 enables communication between the clients 2 and the file server 4 and management computer 6 via the network 3.

The file server 4 provides a file access service to the clients 2 in response to file access requests and is, for example, an NFS (Network File System) server, CIFS (Common Internet File System) server, or similar. As shown in FIG. 1, the file server 4 is composed of a network interface 20, CPU 21, memory 22, and storage interface 23. The connections between the network interface 20 and CPU 21, between the CPU 21 and storage interface 23, and between the CPU 21 and memory 22 are made via buses 24, enabling communication.

The network interface 20 and storage interface 23 are each structured from network interface cards such as SCSI (Small Computer System Interface) cards, LAN (Local Area Network) interface cards, or FC (Fibre channel) interface cards; and are used as data I/O adapters for connecting the file server 4 to the clients 2 and storage subsystem 5.

Figure 3:
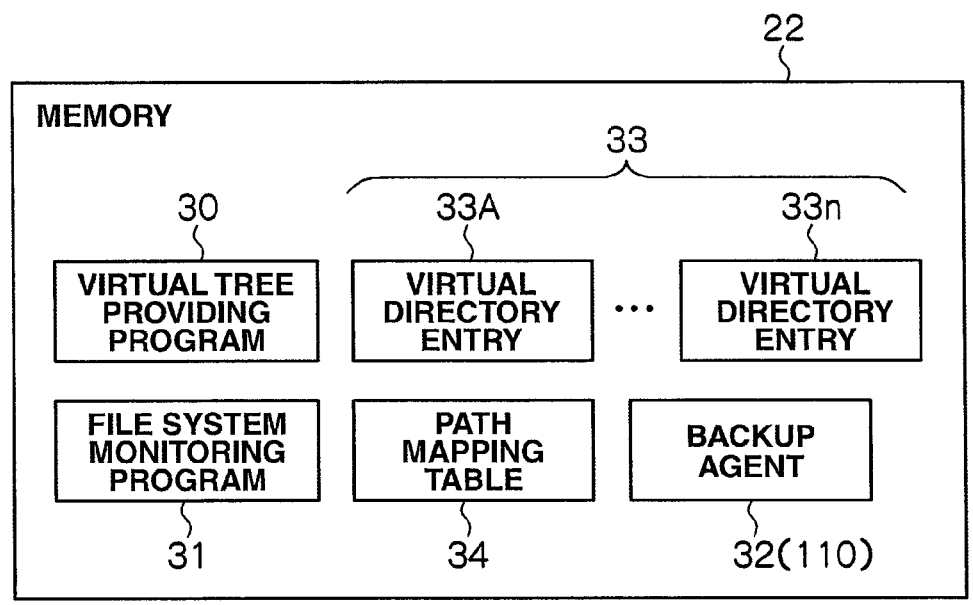
FIG. 3 is a block diagram illustrating various control programs stored in a memory in a file server.

The CPU 21 is the processor in charge of controlling operations in the entire file server 4 and performs various control processing based on various programs stored in the memory 22. The memory 22 is used mainly for storing various programs and management tables. As shown in FIG. 3, a virtual tree providing program 30 (explained later), file system monitoring program 31 and backup agent 32 as well as virtual directory entries 33 (33A-33n) (explained later), which are provided for each user, and path mapping table 34 are stored in the memory 22.

The storage subsystem 5 is composed of a plurality of memory devices 40 and a controller 41 for controlling those memory devices 40.

The memory devices 40 are, for example, expensive disk drives such as FC disks, inexpensive disk drives such as SATA (Serial AT Attachment) disks or optical disk drives, or semiconductor memories. A predetermined number of (for example, four) memory devices 40 make up one RAID (Redundant Array of Inexpensive Disks) group. The memory devices 40 forming one RAID group together provide a memory region, and one or more logical volumes VOL are defined for this memory region. Data in a file system 42 is stored in these volumes VOL.

The controller 41 includes hardware resources such as a CPU and a memory. In response to a request from a client 2, it executes control processing to read/write data from/to a designated volume VOL in the storage subsystem 5.

Figure 4:
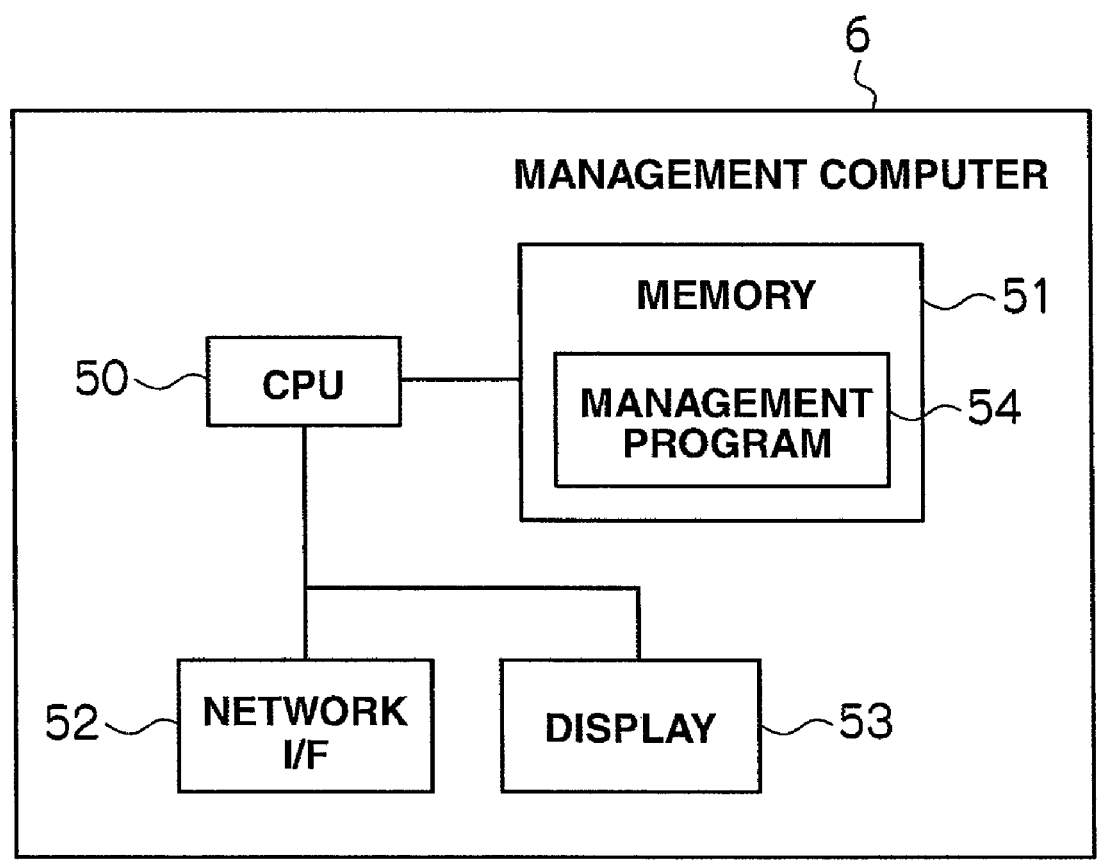
FIG. 4 is a block diagram showing the outline configuration of a management computer.

The management computer 6 is for the maintenance and management of the storage system 1 and is, for example, a personal computer, work station, or mainframe. As shown in FIG. 4, the management computer 6 is composed of a CPU 50, memory 51, network interface 52, and display 53.

The memory 51 stores a management program 54 as a control program and the CPU runs this management program 54 to perform various processing such as collecting required information from the storage subsystem 5, displaying the collected information on the display 53, and setting designated parameters for the storage subsystem 5 and file server 4. The network interface 52 is the same as the network interface 12 (FIG. 2) in the client 2. The display 53 is structured with a CRT (Cathode-Ray Tube), liquid crystal panel, etc.

Figure 5:
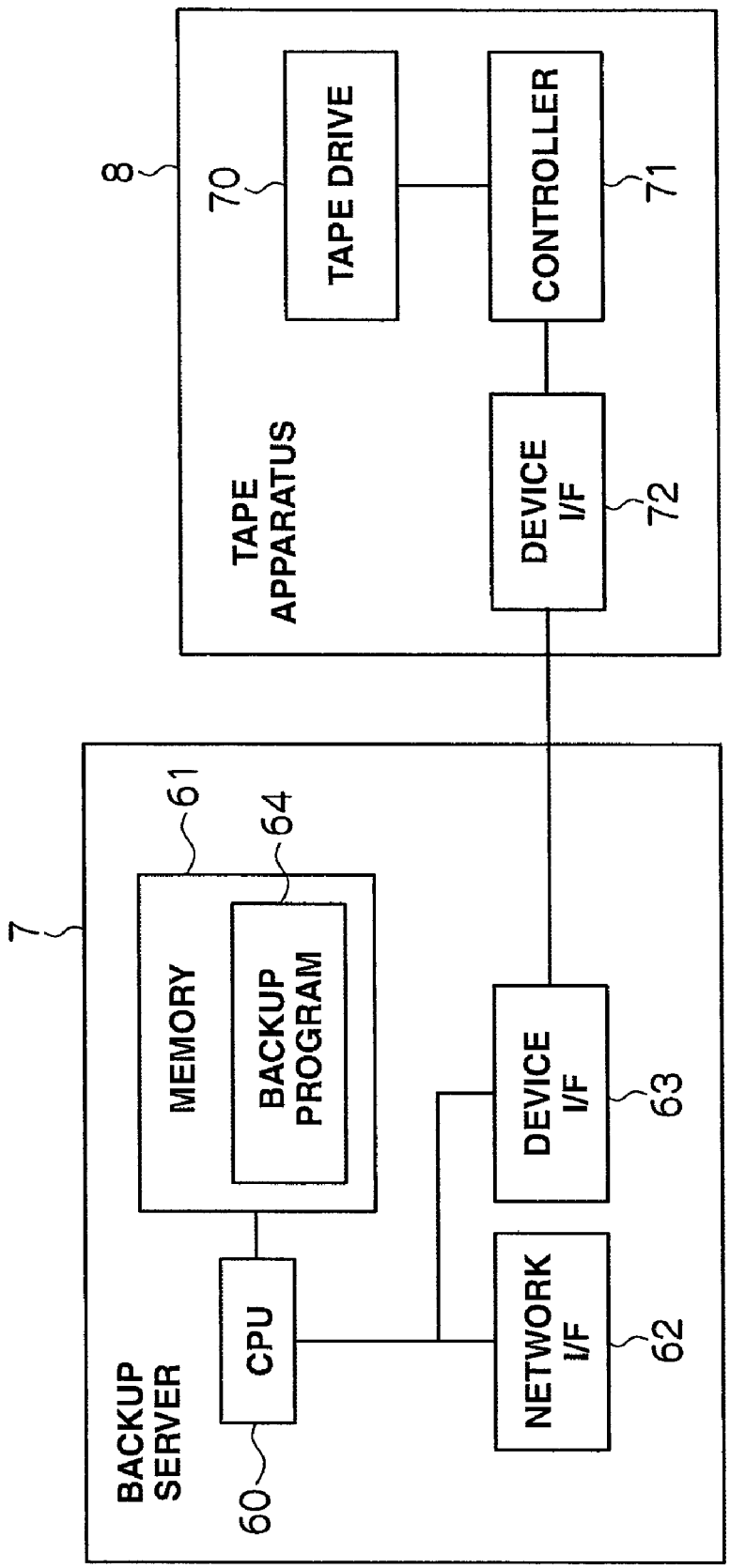
FIG. 5 is a block diagram showing the outline configurations of a backup server and a tape apparatus.

The backup server 7 performs control processing, such as reading the data stored in the storage subsystem 5 to back it up to a magnetic tape loaded in the tape apparatus 8, as well as restoring the data backed up in the magnetic tape back onto the storage subsystem 5. As shown in FIG. 5, the backup server 7 is composed of information processing resources such as a CPU 60, memory 61, network interface 62, and device interface 63.

The memory 61 stores a backup program 64 as a control program and the CPU 60 runs this backup program 64 so that the backup server 7 performs control processing for the aforementioned backup and restoration. The network interface 62 is the same as the network interface 12 (FIG. 2) in the client 2. The device interface 63 is for the transmission of data and commands with the tape apparatus 8.

The tape apparatus 8 is a recording/playback apparatus for reading/writing data from/to a magnetic tape, and is composed of a tape drive 70, controller 71, and device interface 72. The tape drive 70 has a drive mechanism for recording/playing back data to/from a loaded magnetic tape as well as fast-forwarding or rewinding a magnetic tape, under the control of the controller 71. The controller 71 has information processing resources such as a CPU and a memory and controls the operation of the tape drive 70 in response to an instruction from the backup server 7, reading/writing restoration target data or backup target data from/to a magnetic tape.

Figure 6:
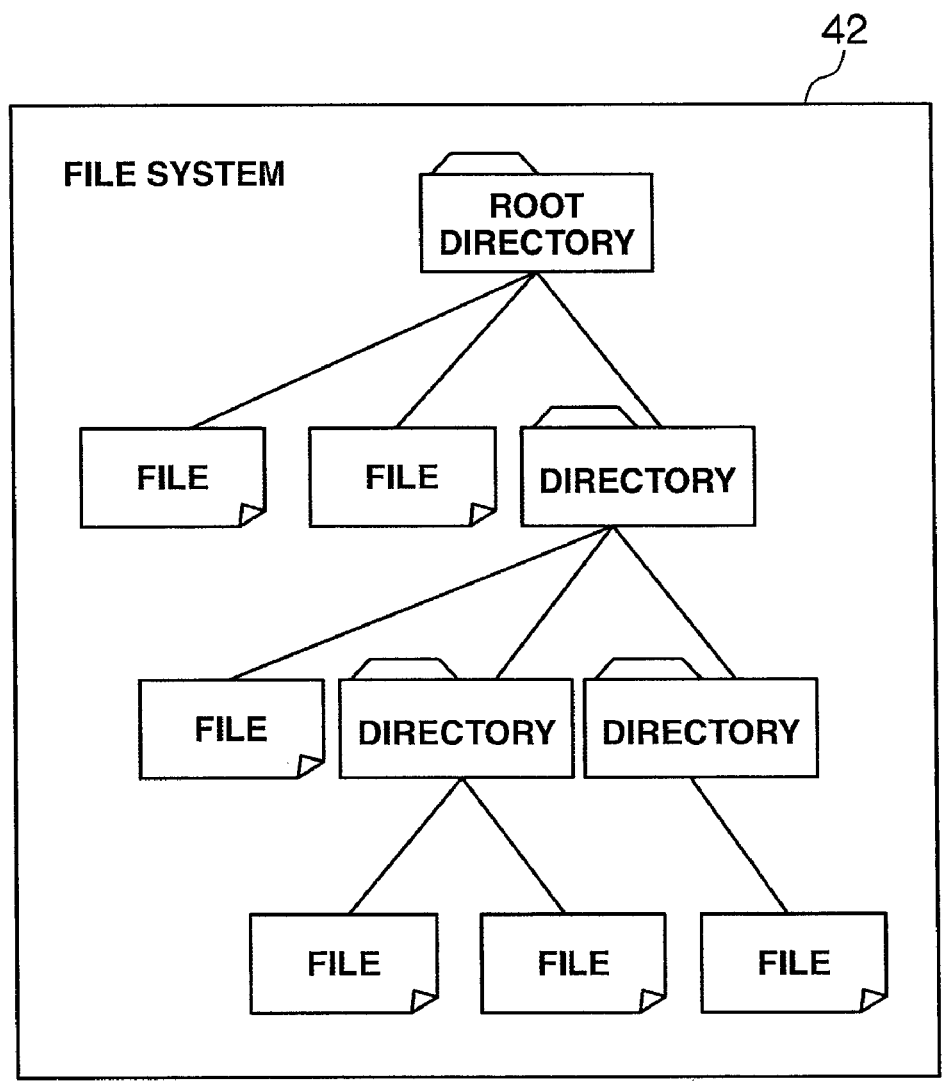
FIG. 6 is a conceptual diagram illustrating a file system.

FIG. 6 shows a general configuration for the file system 42 (FIG. 1). In this file system 42, files are stored in storage locations called directories. A directory may include files as well as more directories, forming a tree structure (hierarchical structure) of directories. In this tree structure of directories, the top level directory is called the 'root (or root directory)' while working directories individually allocated to respective users are called 'home directories.' Each user may establish his/her own directory structure in his/her home directory.

Figure 7:
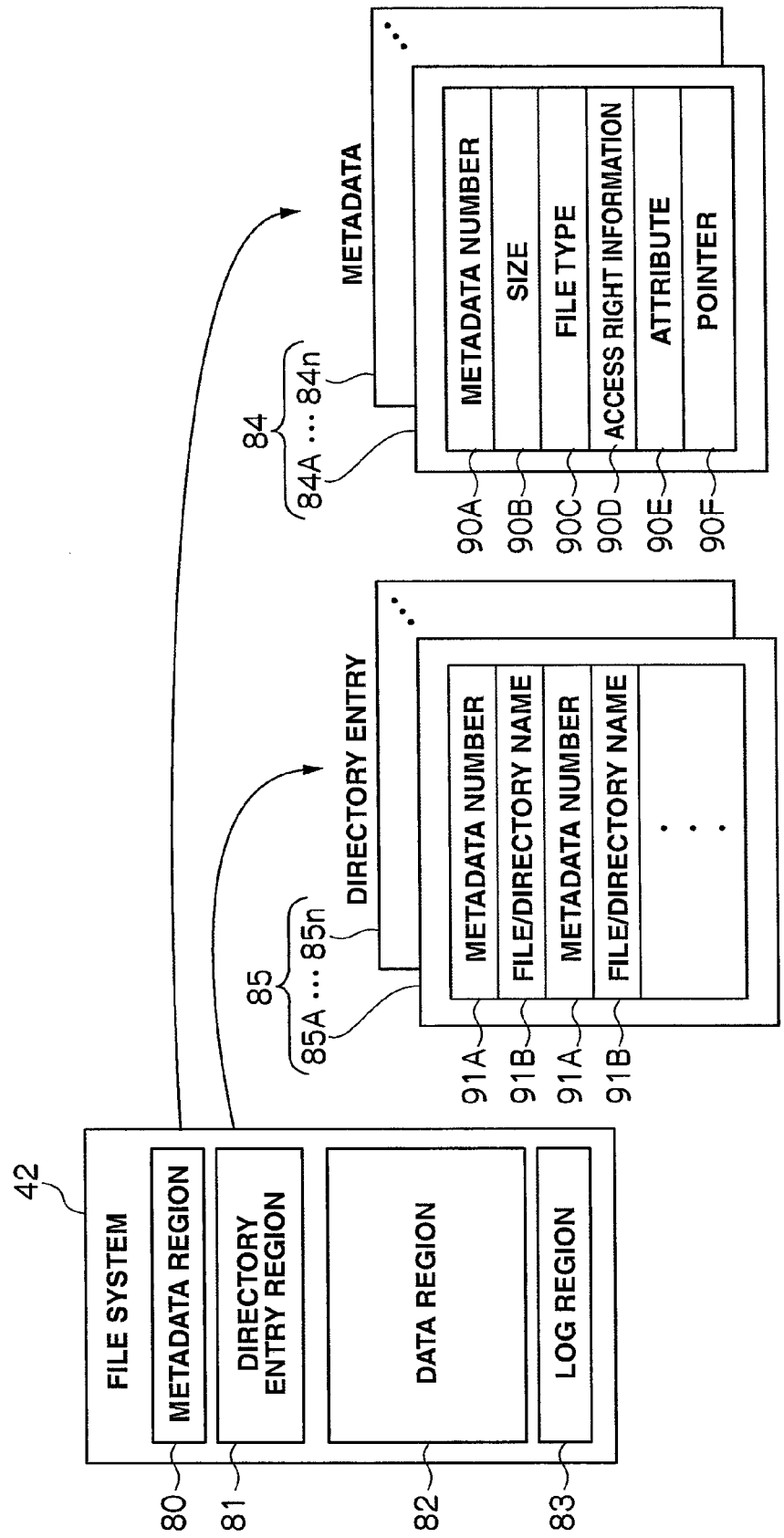
FIG. 7 is a conceptual diagram illustrating a file system.

As shown in FIG. 7, in the file system 42, metadata 84 (84A-84n) for the files and directories, directory entries 85 (85A-85n), data, and logs are stored and centrally managed in memory regions called a metadata region 80, directory entry region 81, data region 82, and log region 83, respectively.

Metadata 84 (84A-84n) is management information created for each file and directory. Each piece of metadata 84 is composed of pieces of information 90A-90F: a metadata number, size, file type, access right, attribute, and pointer.

A metadata number is the identification number uniquely assigned to the piece of metadata 84; the size is the size of data in the corresponding file or directory. The file type is the type of file whether the corresponding file is a file or a directory; and the access right information is the information for the access right set for the corresponding file or directory. The attribute is the name of the owner of the corresponding file or directory; and a pointer indicates the initial address of the region, within the data region 82, that stores the data in the corresponding file when the corresponding object is a file.

A directory entry 85 (85A-85n) is management information created for each directory for managing the tree structure in the file system 42. Each directory entry 85 is composed of metadata numbers and file/directory names of files and directories contained in the corresponding directory. Accordingly, by referring to these directory entries 85, one can know which files and directories present in which directories, and thereby ascertain the tree structure of the entire file system 42.

FIG. 8 shows the specific content of the access right information 90D. As shown in FIG. 8, the access right information 90D is composed of: user name information 90DX indicating the names of users having the access right; and access right content information 90DY indicating the content ('read' and/or 'write') of the access right given to the users. In the example shown in FIG. 8, 'user 1' is allowed only to 'read,' while 'user 2' and 'user 3' are allowed to 'read' and 'write.'

(1-2) File System Function According to Embodiment 1

(1-2-1) Virtual Tree Creation Function

The file system function according to Embodiment 1 of the file server 4 will be explained below.

The file server 4 according to Embodiment 1 has a file system function loaded therein for providing each user with a virtual file system tree ('virtual tree') suitable for the user and backing up and restoring the information for the virtual trees.

In practice, the file server 4 creates a virtual tree according to the rules below and provides it to a user.

Figure 9A:
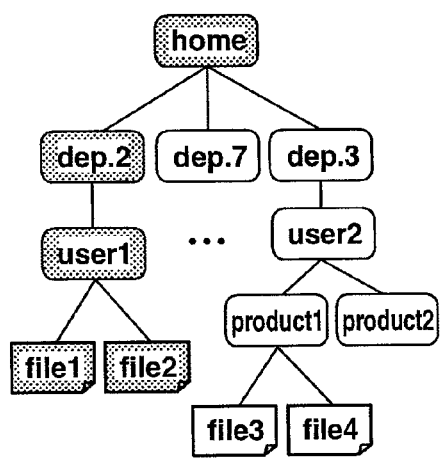
FIGS. 9(A)-9(D) are conceptual diagrams illustrating virtual trees.

First, the file server 4 creates a virtual tree by copying, within the actual file system tree, the tree structure (only the file names and directory names) from the root directory to the home directory of the user currently a target ('target user') as well as the structure below the home directory. For example, when the actual file system tree has the tree structure shown in FIG. 9(A) and the home directory of the target user is 'User 1,' the virtual tree for the target user at this stage will be as shown in FIG. 9(B) with a solid line.

Figure 9B:
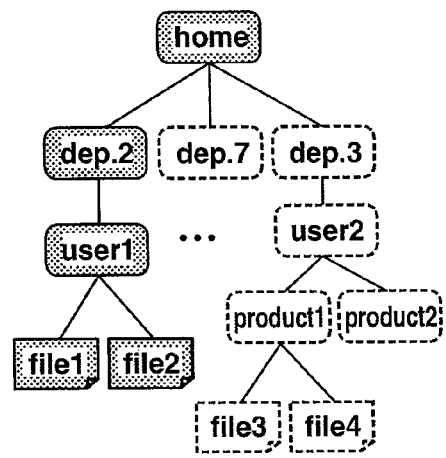
Figure 9C:
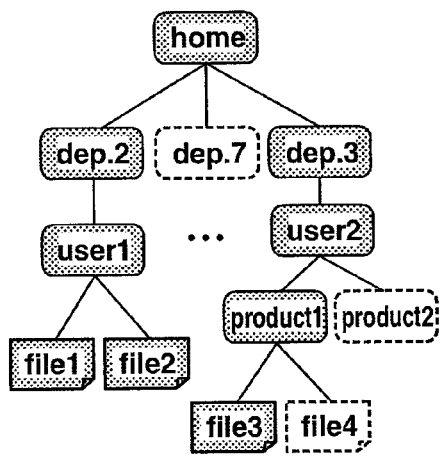

Then, the file server 4 looks up other user trees and if there is an accessible file, it connects that file to the above-created virtual tree (FIG. 9(B)). Here, the directories present on the path from the root directory to that file are also created in the above-created virtual tree, regardless of whether or not the target user has an access right for them. Accordingly, when another user's 'file 3' is public in the example shown in FIG. 9(A), the virtual tree for the target user will be as shown in FIG. 9(C). The file server 4 then provides the thus-created virtual tree to the target user as a file system tree.

Figure 10:
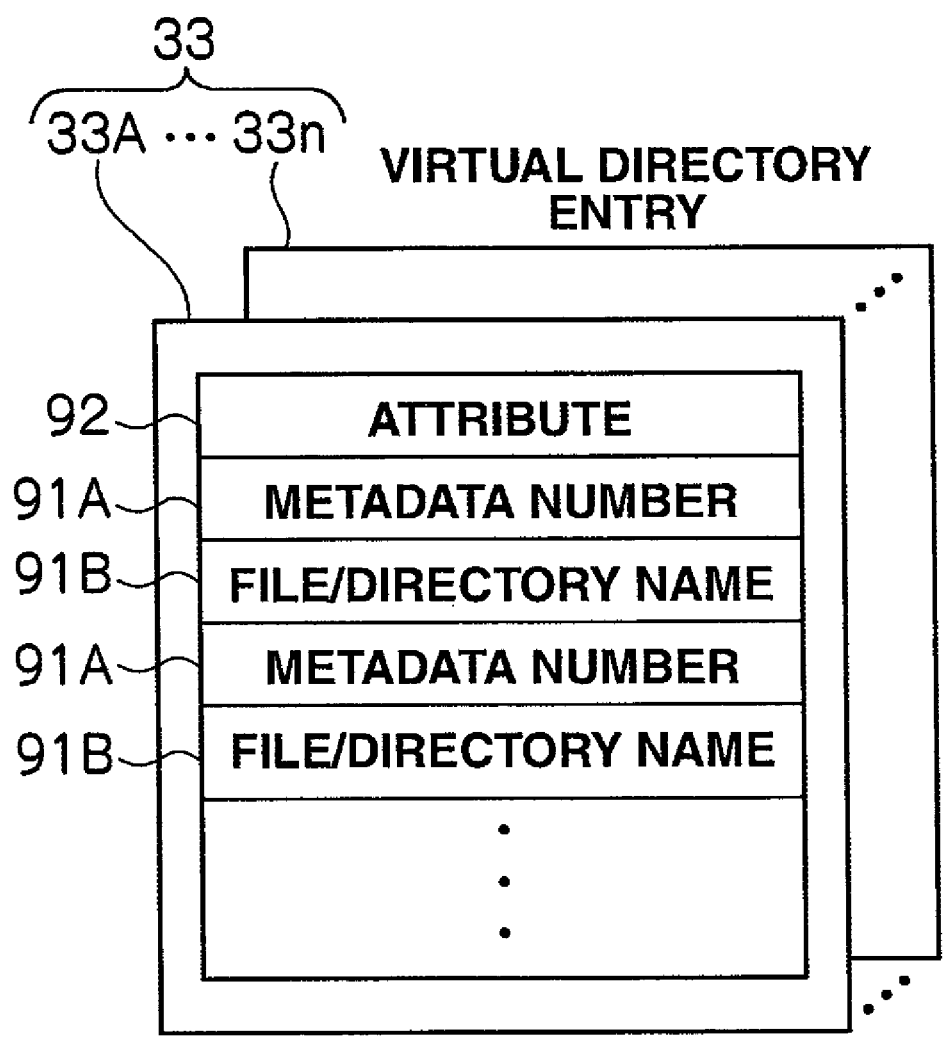
FIG. 10 is a conceptual diagram illustrating a virtual directory entry.

The file server 4 also stores and manages the tree structure of the above-created virtual tree for the target user as a virtual directory entry 33 (33A-33n) as shown in FIG. 10, in the memory 22 (FIG. 1). Note that this virtual directory entry 33 has the same structure as that of the directory entry 85 described in relation to FIG. 7, except that it also includes an attribute 92, which is the name of the user of that virtual tree.

Figure 11:
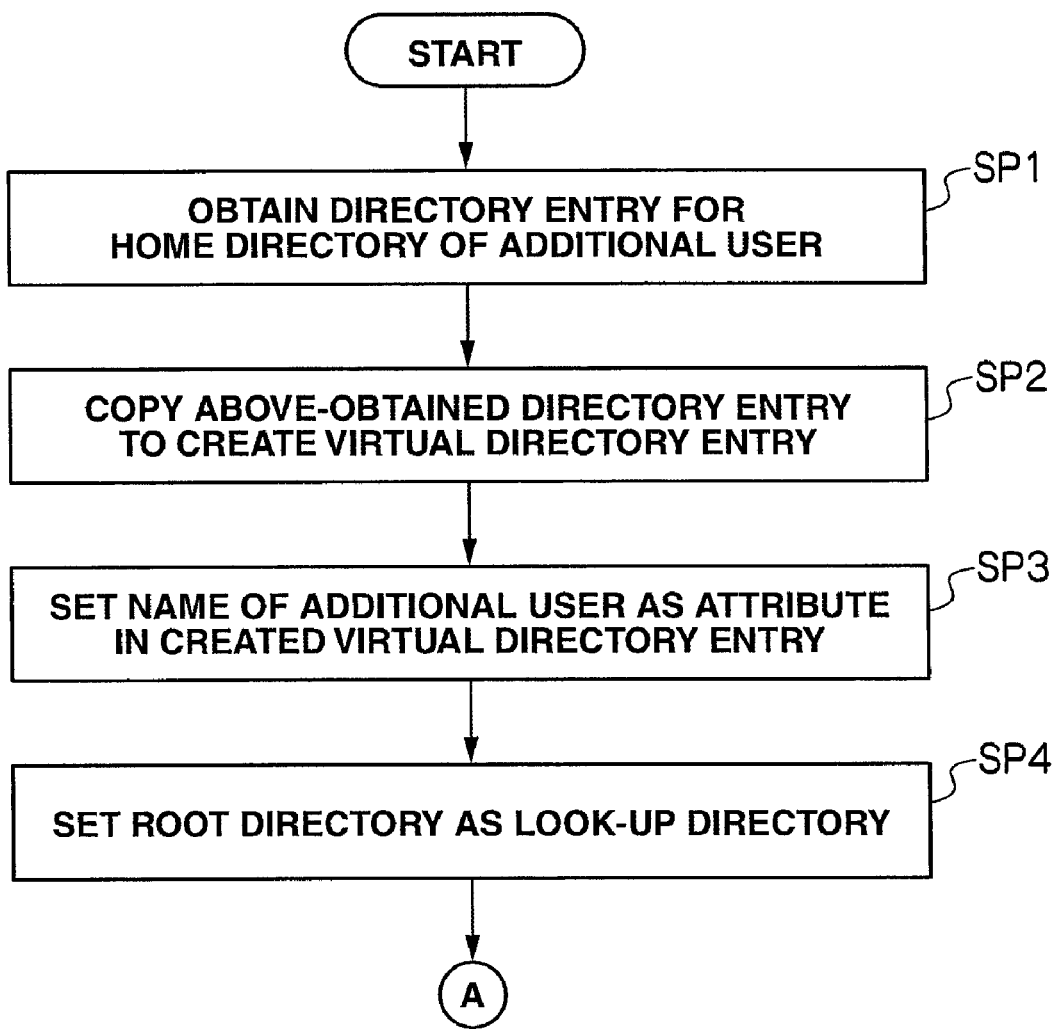
FIG. 11 is a flowchart illustrating virtual tree creation processing.
Figure 12:
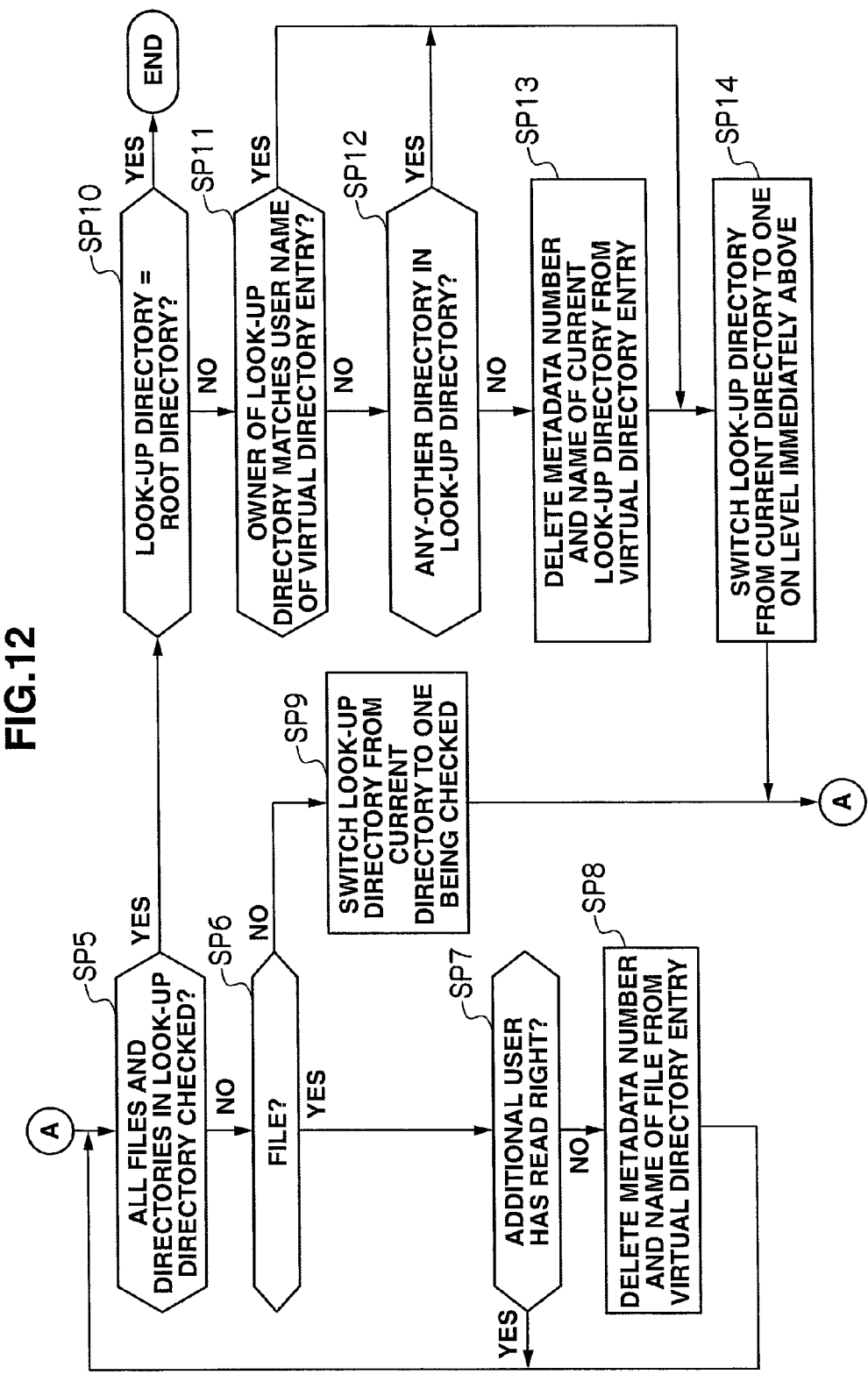
FIG. 12 is a flowchart illustrating virtual tree creation processing.

FIG. 11 is a flowchart showing the specific content of the processing performed by the CPU 21 in the file server 4 to create a virtual tree for each user as described above.

In this storage system 1, when a system administrator adds a user via the management computer 6, the management computer 6 sends a notice to the file server 4 via the network 3. When the CPU 21 in the file server 4 receives this notice, it reads and obtains, based on the file system monitoring program 31 (FIG. 3) stored in the memory 22, the directory entry 85 (FIG. 7) for the directory designated as the home directory for the added user ('additional user') from the storage subsystem 5 (SP1).

The CPU 21 then creates a virtual directory entry 33 for that additional user by copying the above-obtained directory entry 85 to the memory 22 (SP2). Thus, the virtual tree made of the copy of the tree structure below the home directory for that additional user is created. The CPU 21 then sets the name of the additional user as the attribute 92 (FIG. 10) in that virtual directory entry 33 (SP3).

The CPU 21 then sets the root directory as a target directory ('look-up directory') for the look-up processing following step SP5 (SP4); and judges whether or not it has performed check processing in step SP6 for all the files and directories present in the look-up directory (SP5).

If the judgment is negative, the CPU 21 selects one file or directory within the look-up directory; reads the metadata 84 (FIG. 7) for that selected file or directory from the storage subsystem 5; and judges whether or not the selected one is a file based on that metadata 84 (SP6).

If the judgment in step SP6 is positive, the CPU 21 reads the access right information 90D (FIG. 7) in the metadata 84 for that file stored in the storage subsystem 5; and judges whether or not the additional user has a right to read that file based on the access right information 90D (SP7). If the judgment is positive, the CPU 21 returns to step SP5.

Meanwhile, if the judgment in step SP7 is negative, the CPU 21 deletes the metadata number and file name for that file from the additional user's virtual directory entry 33 (FIG. 10) stored in the memory 22 (SP8); and returns to step SP5.

Because the steps SP6 and SP7 are performed for all the files present in the current look-up directory, metadata numbers and file names of the files for which the additional user has no access right will all be deleted from the additional user's virtual directory entry 33.

Meanwhile, if the judgment in step SP6 is negative, it means that the selected one is a directory. Accordingly, the CPU 21 switches the look-up directory from the root directory to that directory; returns to step SP5; and repeats the same steps (SP5-SP9-SP5) until the judgment in step SP5 is positive.

If the judgment in step SP5 is positive in the end, the CPU 21 judges whether or not the current look-up directory is the root directory based on the virtual directory entry for the additional user (SP10).

If the judgment is negative, the CPU 21 judges whether or not the owner of the current look-up directory matches the user name of the virtual directory entry 33—more specifically, whether or not the user name identified by the attribute 90E (FIG. 7) in the metadata 84 for the current look-up directory matches the user name identified by the attribute 92 (FIG. 10) for the virtual directory entry 33 (SP11).

If the judgment in step SP11 is positive, the CPU 21 switches the look-up directory from the current directory to the one on the level immediately above (SP14); and returns to step SP5. Meanwhile, if the judgment in step SP11 is negative, the CPU 21 judges whether or not any other directory is present in the look-up directory (SP12).

If the judgment in step SP12 is positive, it means that a file accessible for the additional user may be present in that other directory or directories below that other directory. It is necessary to keep that other directory so that the additional user can access the files. Accordingly, if the judgment in step SP12 is positive, the CPU 21 switches the look-up directory from the current directory to the one on the level immediately above (SP14) and returns to step SP5.

Meanwhile, if the judgment in step SP12 is negative, it means that there is no possibility that a file accessible for the additional user is present below the look-up directory. Therefore, if the judgment in step SP12 is negative, the CPU 21 deletes the metadata number and directory name of the current look-up directory from the virtual directory entry 33 (SP13); switches the look-up directory from the current directory to the one on the level immediately above (SP14); and returns to step SP5.

As a result of the loop processing from steps SP5-SP14, the virtual tree for the additional user is created, the virtual tree being composed only of the information for: all the directories from the root directory to the home directory for the additional user; all the directories and files below the additional user's home directory; all the files accessible for the additional user; and the directories between the root directory and those accessible files.

When the CPU 21 has performed the judgment in steps SP6 and SP7 for all the files in the file system 42 and the judgment in step SP10 is positive, it terminates this virtual tree creation processing.

(1-2-2) Virtual Tree Update Function

After the virtual tree creation processing, when any of the users changes any file access right or deletes a file, the file server 4 reflects the change or deletion in the virtual tree(s) of the user(s) involved, for example, the user(s) assigned additional access right(s). For example, where the tree structure of a user's virtual tree immediately after creation is as shown in FIG. 9(B), when another user makes a 'file 3' public, the virtual tree for the user will be updated to the state shown in FIG. 9(C).

Figure 13:
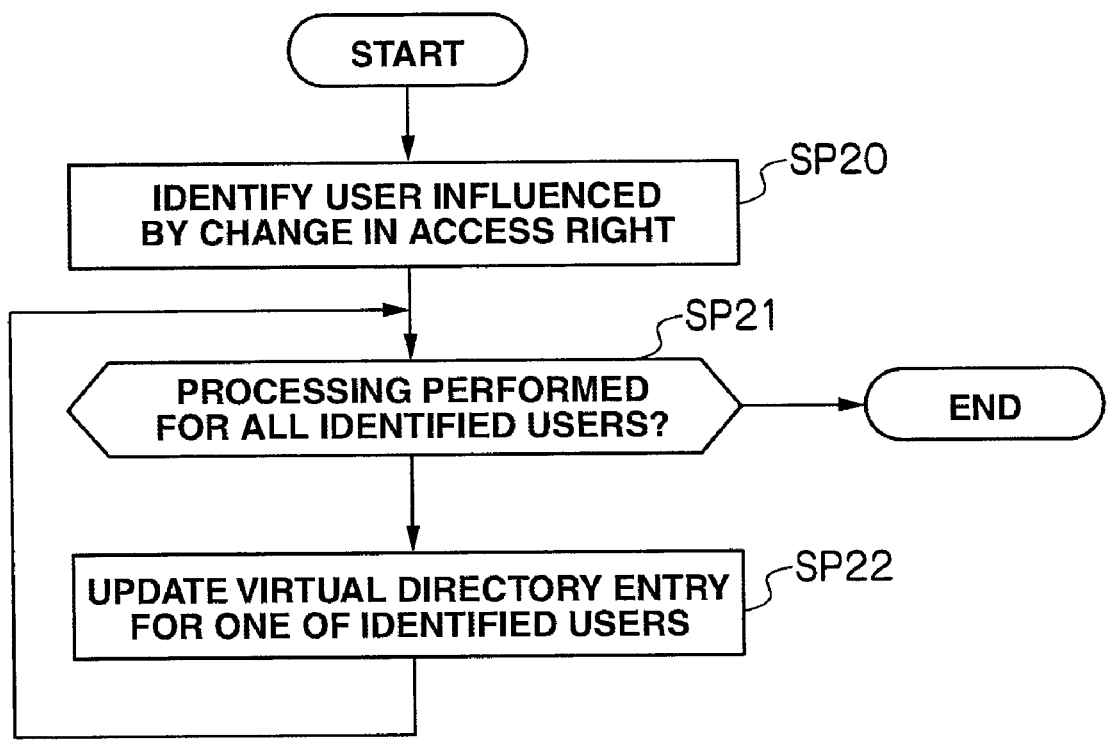
FIG. 13 is a flowchart illustrating virtual tree update processing.

FIG. 13 is a flowchart showing the specific content of the processing performed by the CPU 21 to make a change in the virtual tree of a target user according to a change in the access right to a file in the file system 42.

When the CPU 21 receives, from any of the clients 2, an access right change request—a request for a change to be made in the access right for a file owned by a user of the client 2, it changes the content of the access right information 90D (FIG. 7) in the metadata 84 for that file stored in the storage subsystem 5 to the content designated in the access right change request.

Also, in parallel with the above change of the access right information 90D, the CPU 21 first identifies, based on the file system monitoring program (FIG. 3) and the currently-received access right change request, the user(s) influenced by the change in that access right (e.g., user(s) newly assigned the access right or user(s) deprived of the access right) (SP20). For example, when the access right change request requests that an access right be assigned to a user, an access right be deprived from a user, or that the content of an access right of a user be changed (e.g., from 'read/write' to 'read'), the CPU 21 identifies that 'user' as an 'influenced user.'

The CPU 21 then judges whether or not it has performed later-mentioned virtual tree change processing for all the users identified in step SP20 (SP21).

If the judgment is negative, the CPU 21 specifies one of the users identified in step SP20 and updates his/her virtual directory entry 33, i.e., when a new access right is assigned to the user by the access right change, the new accessible file and the directories from the root directory to that file are added to the virtual tree of that user; or when the user is deprived of his/her access right by the access right change, the CPU 21 deletes the relevant file and, if necessary, the directories from the root directory to that file from the virtual tree of that user (SP22).

The CPU 21 then repeats the same steps (SP21-SP22-SP21) and when it has updated the virtual directory entries 33 for all the users identified in step SP20 and so the judgment in step SP21 is positive, it terminates this virtual tree update processing.

(1-2-3) Virtual Tree Backup Function

In this storage system 1, a user may send from the client 2 a backup request designating a virtual tree to back up, to the backup server 7.

When the CPU 60 in the backup server 7 receives a backup request, it instructs, based on the backup program 64, the storage subsystem 5 to back up a designated target virtual tree. Having received this instruction, the storage subsystem 5 sends the data for the designated virtual tree (relevant virtual directory entry 33, data for the respective files present in the virtual tree realized by the virtual directory entry 33, metadata for the respective files and directories present in the virtual tree, etc.) to the backup server 7 via the file server 4. Having received this data, the CPU 60 in the backup server 7 controls the tape apparatus 8 so that it records the data on a magnetic tape.

Figure 14:
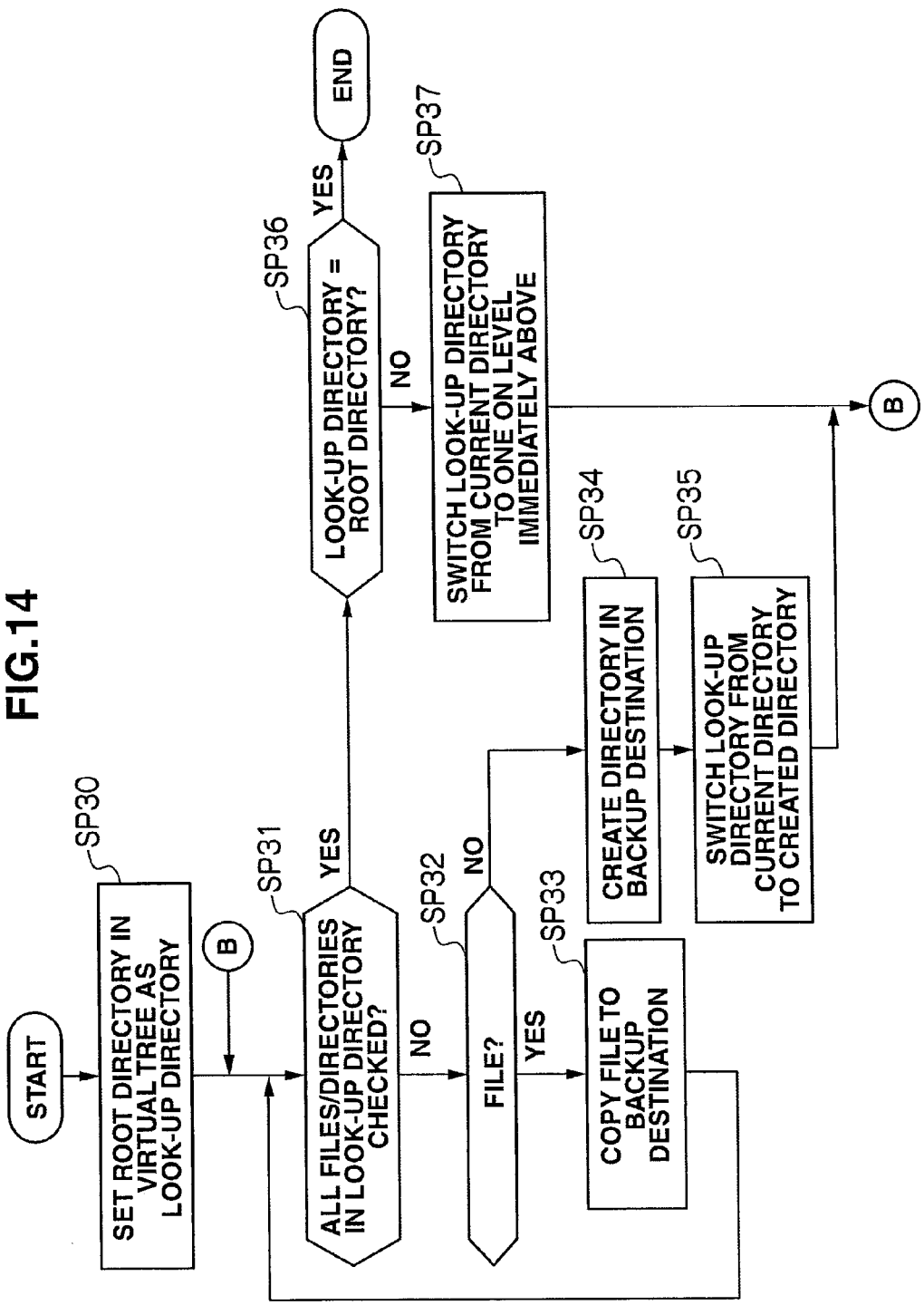
FIG. 14 is a flowchart illustrating virtual tree backup processing.

FIG. 14 is a flowchart showing the specific content of the processing performed by the CPU 21 in the file server 4 to back up a virtual tree as described above.

Having received a backup execution command designating a virtual tree from the backup server 7, the CPU 21 sets, based on the backup agent 32 (FIG. 3), the root directory in the designated virtual tree as a look-up directory based on the virtual directory entry 33 for the designated virtual tree stored in the memory 22 (SP30).

The CPU 21 then judges whether or not it has performed check processing in step SP32 for all the files and directories in the current look-up directory (SP31). If the judgment is negative, the CPU 21 selects one of the files or directories in the look-up directory; reads the metadata 84 (FIG. 7) for that selected file or directory from the storage subsystem 5; and judges whether or not the selected one is a file based on the metadata 84 (SP32).

If the judgment in step SP32 is positive, the CPU 21 reads the data in that file from the storage subsystem 5; and sends it to the backup server 7. Then, the tape apparatus 8 backs up, under the control of the backup server 7, this data on a magnetic tape by recording (SP33).

Meanwhile, if the judgment in step SP32 is negative, the CPU 21 sends the data in the virtual directory entry 33 for the directory selected in step SP32 to the backup server 7. The tape apparatus 8 then backs up, under the control of the backup server 7, the data in the magnetic tape and thereby, the directory is created in the backup destination (SP34).

The CPU 21 then switches the look-up directory from the root directory to the directory that has been backed up in step SP34 (SP35); and repeats the same steps (SP31-SP35-SP31) until the judgment in step SP31 is positive.

If the judgment in step SP31 is positive in the end, the CPU 21 reads the metadata 84 for the current look-up directory from the storage subsystem 5; and judges whether or not the current look-up directory is the root directory based on the metadata 84 (SP36).

If the judgment in step SP36 is negative, the CPU 21 switches the look-up directory from the current look-up directory to the one on the level immediately above (SP37); and returns to step SP31. It then repeats the steps (SP31-SP37-SP31) until the judgment in step SP36 is positive.

When the CPU 21 has backed up all the files and directories in the designated virtual tree and the judgment in step SP36 is positive, it terminates this backup processing.

(1-2-4) Virtual tree restoration function

In this storage system 1, a user may send, from the client 2, a restoration request designating a restoration target backup virtual tree, to the backup server 7.

When the CPU 60 (FIG. 5) in the backup server 7 receives a restoration request, it controls, based on the backup program 64, the tape apparatus 8 so that it can read the data for the designated backup virtual tree (the relevant virtual directory entry 33, and the data for the respective files present in the virtual tree realized by the virtual directory entry 33) from the magnetic tape, and sends it to the file server 4 with the restoration request.

Having received the restoration request, the file server 4 stores the virtual directory entry 33 for the designated backup virtual tree and the data for the respective files present in the designated backup virtual tree in the memory 22; and restores the backup virtual tree based on these data according to the rules below.

Specifically, regarding the files in the home directory, the file server 4 restores them as usual while maintaining the tree structure. Accordingly, in the case where the virtual tree having the tree structure shown in FIG. 9(C) has been backed up and when the home directory of the target user is 'user1,' the file server 4 restores the backup 'file 1' and 'file 2' as usual.

When the backup data includes a file of a different user, the file server 4 compares the update time and version of the backup file with those of the corresponding present file; and when they are the same, it terminates the processing without restoring that backup file. Accordingly, in the case of FIG. 9(C), the backup virtual tree will be restored with its tree structure intact.

Figure 9D:
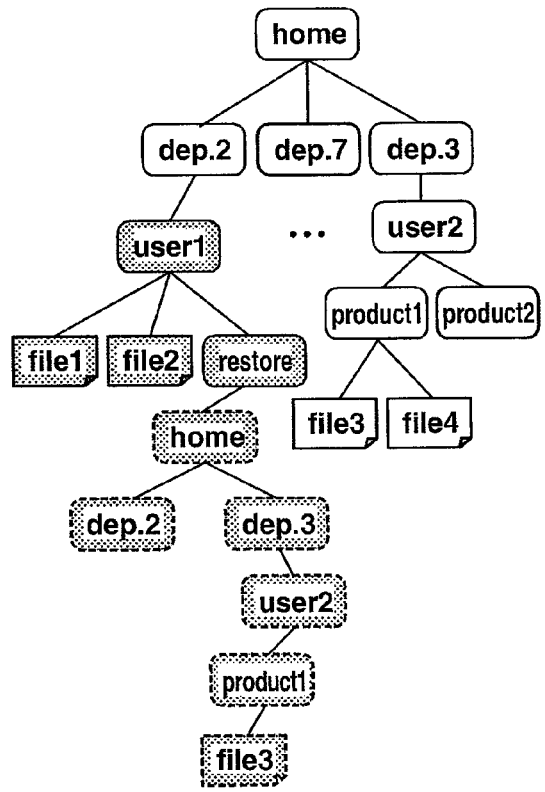

Meanwhile, when at least either the update time or version of the backup file is different from that of the corresponding present file (i.e., the present file is newer than the backup file), the file server 4 creates a special directory ('restoration directory') in the target user's home directory; and restores the backup-point-in-time file back into the restoration directory while maintaining the tree structure. Accordingly, in the case shown in FIG. 9(C), when the other user's file is the 'file 3,' the backup 'file 3' is restored back into the restoration directory '.restor' created in the target user's home directory, with its tree structure intact as shown in FIG. 9(D).

Here, for the file restored back into the restoration directory, the file server 4 adds the path name of the restoration directory at the top of the path name of that restored file. For example, in FIG. 9(D), when the original path name of the file restored in the restoration directory is '/home/dep.3/user2/prod1/file3' and the path name of the restoration directory is '/home/dep.2/user1/.restor,' the new path name for that restored file will be '/home/dep.2/user1/.restor/home/dep.3/user2/product1/file3. The file server 4 then registers the metadata number of the metadata 84 for that restored file, the original path name of the restored file, and the new path name of the restored file—including the path name of the restoration directory—in the path mapping table 100 while establishing correspondence relationships between them.

When the file server 4 receives a request to access a file, it refers to the path mapping table 100 and, if a new path name is registered for that file, it accesses to that file based on that new path name.

Figure 16:
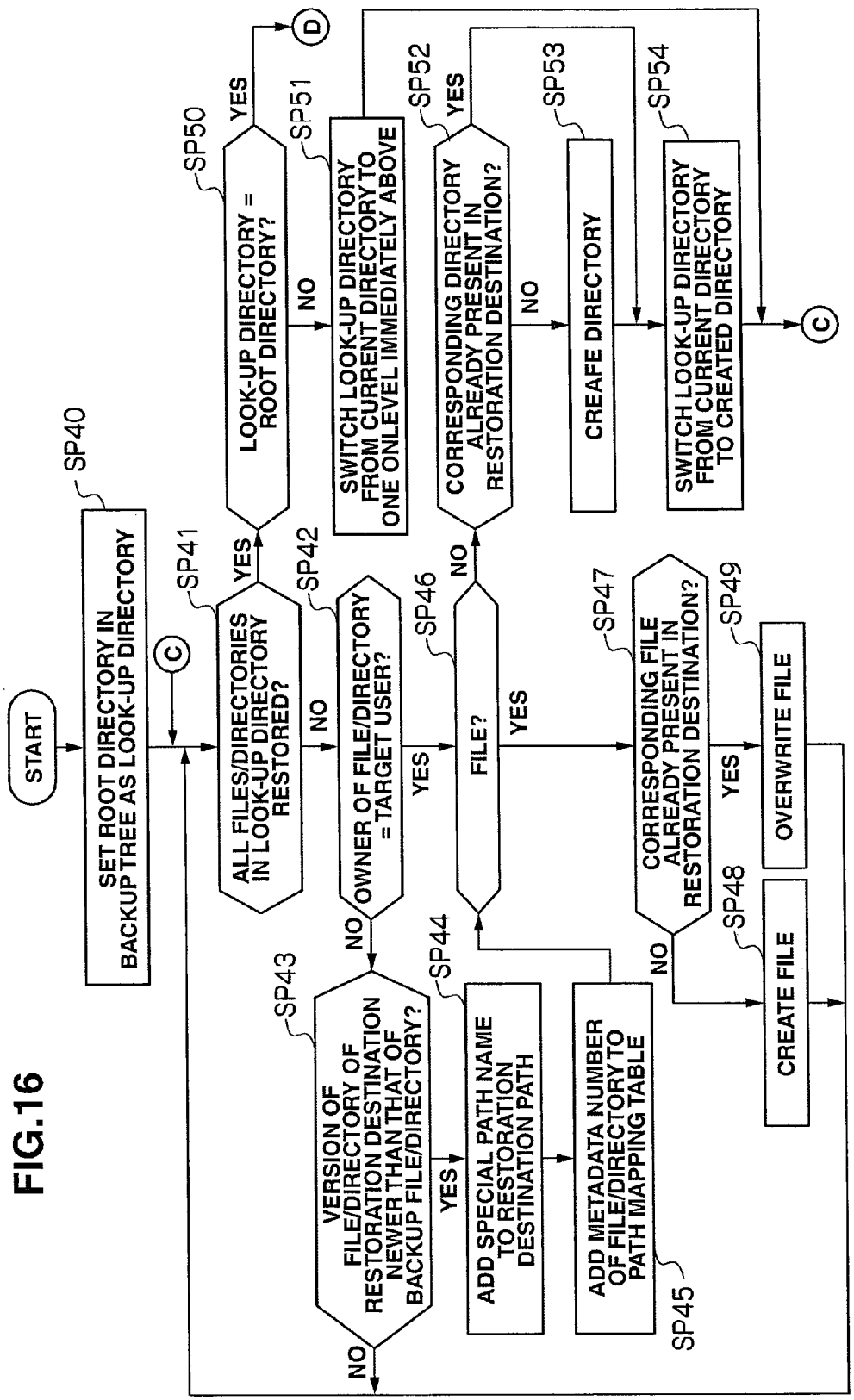
FIG. 16 is a flowchart illustrating virtual tree restoration processing.
Figure 17:
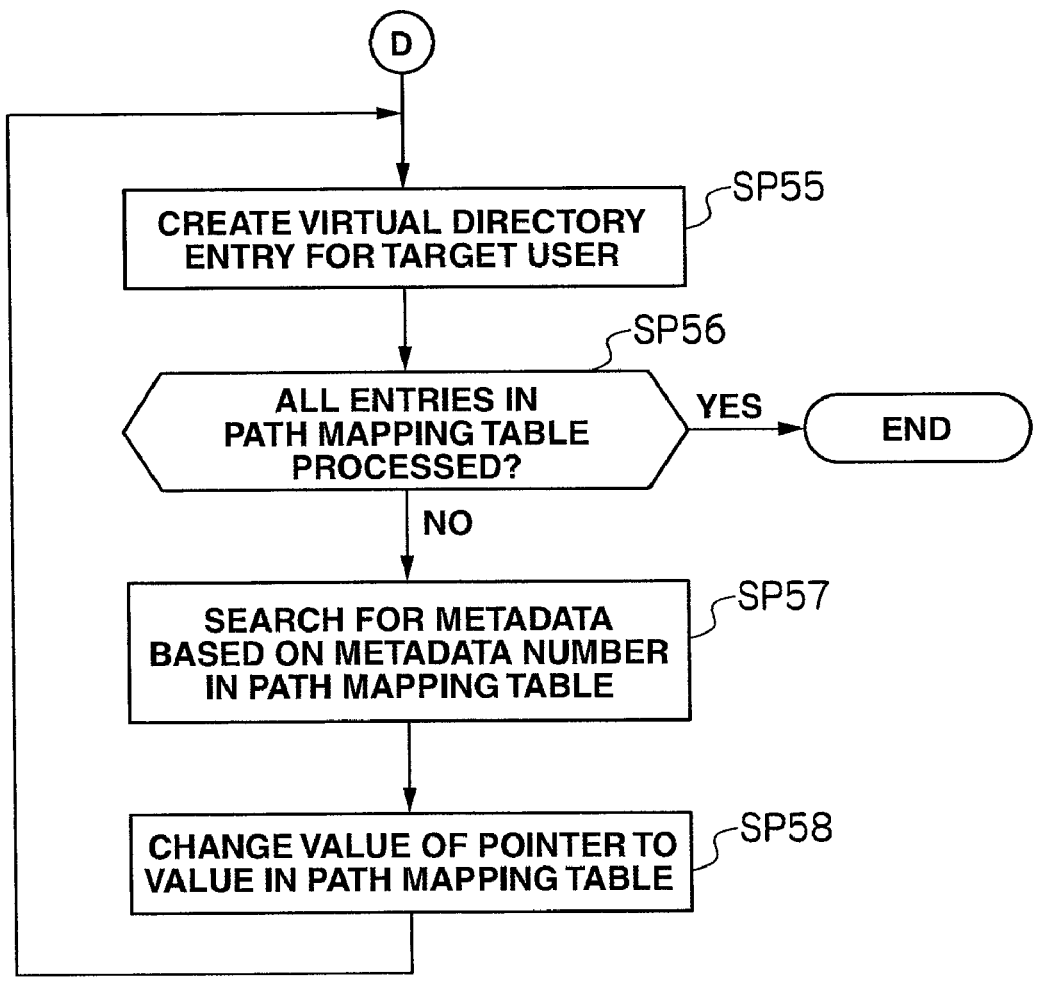
FIG. 17 is a flowchart illustrating virtual tree restoration processing.

FIGS. 16 and 17 are flowcharts showing the specific content of the processing performed by the CPU 21 in the file server 4 to restore a backup virtual tree as described above.

When the CPU 21 receives, from the backup server 7, a request to restore a backup virtual tree, the virtual directory entry 33 for the backup virtual tree, the data for the respective files present in the backup virtual tree, and the metadata 84 (FIG. 7) for the respective files and directories in the backup virtual tree, it first sets, based on the backup agent 32 (FIG. 3), the root directory in the backup virtual tree as a look-up directory, the root directory being identified based on the data for the restoration target backup virtual tree sent from the backup server 7 (SP40).

The CPU 21 then judges whether or not it has restored all the files and directories in the current look-up directory (SP41). If the judgment is negative, the CPU 21 selects one of the backup files or directories and judges whether or not the owner of the backup file or directory in the current look-up directory is the user of the restoration target backup virtual tree (SP42).

If the judgment is positive, the CPU 21 proceeds to step SP46, while if the judgment is negative, it judges whether or not the update time and version of the corresponding present file or directory are newer than those of the backup file or directory (SP43).

If the judgment in step SP43 is negative, the CPU 21 then returns to step SP41. Meanwhile, if the judgment in step SP43 is positive, it adds the path name of a restoration directory—a special path name—to the original path name of the restored file or directory (SP44). The CPU 21 then registers the metadata number of the file or directory restored back onto the restoration directory in the path mapping table 100 while establishing correspondence relationships with its original path name and new path name, which is made by adding the special path name to the original path name (SP45).

The CPU 21 then judges whether or not the current restoration target is a backup file or not (SP46) and, if it is a backup file, the CPU 21 judges whether or not the corresponding file is already present in the restoration destination (SP47). If the judgment is negative, the CPU 21 restores (in other words, creates) the backup file back into the restoration directory (SP48) and returns to step SP42.

Meanwhile, if the judgment in step SP47 is positive, the CPU 21 overwrites the data in the present file with the data in the current restoration target backup data (SP49); and returns to step SP41.

Meanwhile, if the judgment in step SP46 is negative, the CPU 21 judges whether or not the corresponding directory is already present in the restoration destination (SP52). If the judgment is positive, the CPU 21 proceeds to step SP54. Meanwhile, if the judgment is negative, it restores the backup directory (SP53). The CPU 21 then sets that directory as the look-up directory (SP54); and returns to step SP41.

Meanwhile, if the judgment in step SP41 is positive, the CPU 21 judges whether or not the current look-up directory is the root directory (SP50). If the judgment is negative, it switches the look-up directory from the current directory to the one on the level immediately above (SP51); and returns to step SP41.

Meanwhile, if the judgment in step SP50 is positive, the CPU 21 creates a virtual directory entry 33 (FIG. 10) for the user and stores it in the memory 22 (FIG. 1) (SP55).

The CPU 21 then judges whether or not it has performed the same processing for all the entries in the path mapping table 100 (SP56); and, if the judgment is negative, it searches the metadata for the respective restoration target files and directories for the metadata for the entry the CPU 21 has not yet performed the processing for, based on the metadata number of that entry in the path mapping table 100 (SP57).

The CPU 21 then changes the value of the pointer information 90F (FIG. 7) contained in the found metadata to the initial address of the region, within the data region 82, that stores the data corresponding to the file or directory existing at the location of the 'new path name' for the above-found entry in the path mapping table 100 (SP58) and returns to step SP55. The CPU 21 then performs the same processing (SP55-SP58-SP55) for all the entries in the path mapping table 100.

When the CPU 21 has performed the same processing for all the entries in the path mapping table 100 and the judgment in step SP56 is positive, it terminates this virtual tree restoration processing.

(1-3) Effects of Embodiment 1

With the foregoing configurations, a file made public by a different user can be backed up without losing its physical location. Moreover, regarding a file or directory that a target user does not have ownership of and that has already been updated, the corresponding backup file or directory is restored to a restoration directory with its original tree structure intact. Accordingly, in the restored virtual tree, even if the user's file has a link to a file of another user, the occurrence of inconsistencies between the user's file and the other user's file can be effectively prevented, thereby realizing an easy-to-use storage system 1.

(2) Embodiment 2

In Embodiment 1, backup of data in the file system 42 (FIG. 6) is performed by backing up the data for a previously-created virtual tree. In Embodiment 2, backup of data in the file system 42 is performed by checking, for each file present in the file system 42, whether or not a target user has an access right for it; and backing up the data for the files the user has access rights for.

Figure 18:
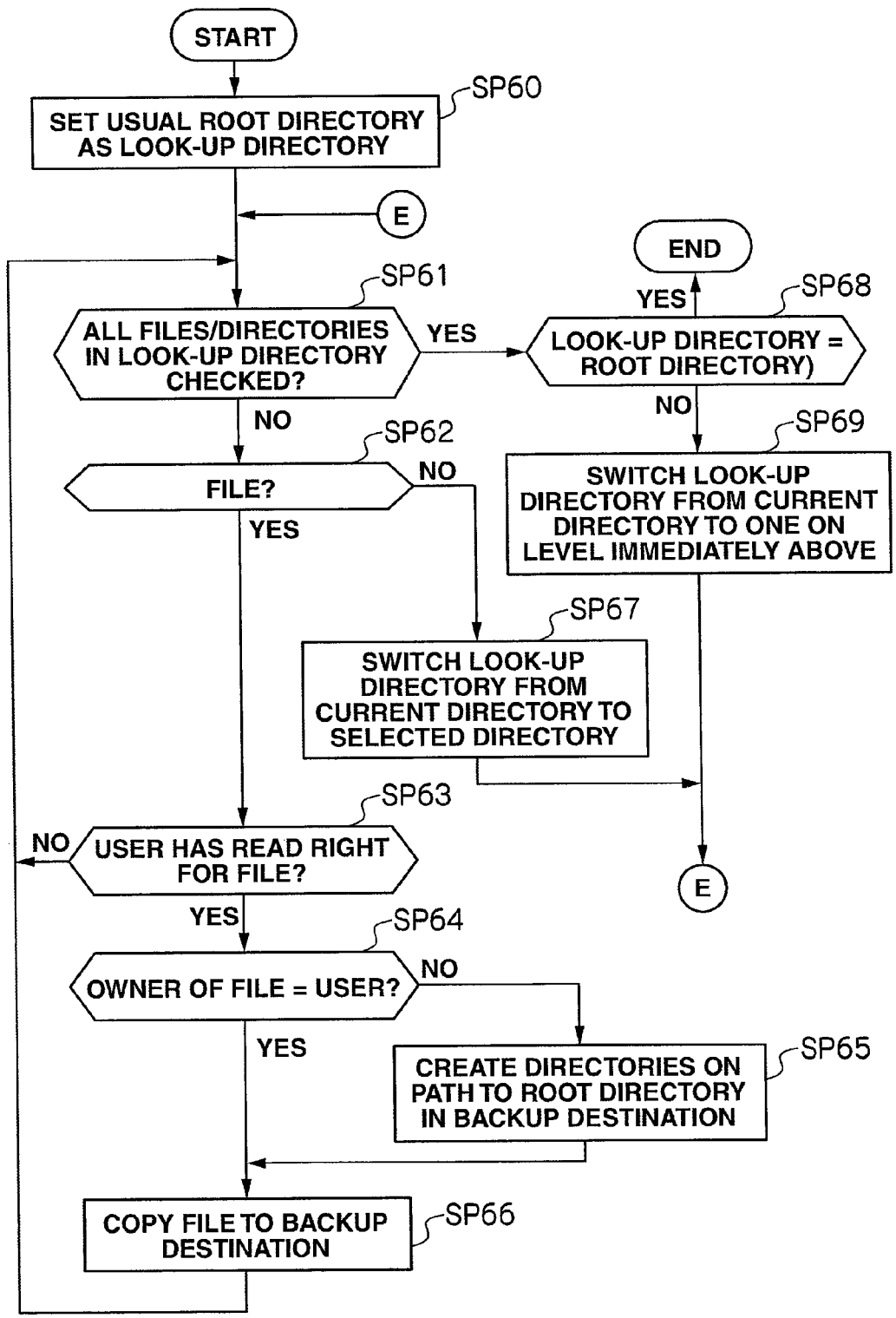
FIG. 18 is a flowchart illustrating virtual tree backup processing according to Embodiment 2.

FIG. 18 is a flowchart showing the specific content of the virtual tree backup processing according to Embodiment 2 performed by the CPU 21 in the file server 4.

When the CPU 21 receives, from the backup server 7, a backup execution instruction designating a virtual tree, it reads, based on the backup agent 110 (FIG. 3) according to Embodiment 2 stored in the memory 22, the respective directory entries 85 (FIG. 7) in the file system 42 stored in the storage subsystem 5; and sets the root directory of the file system tree as the look-up directory based on these directory entries 85 (SP60).

The CPU 21 then judges whether or not it has performed check processing in step SP62 for all the files and directories in the current look-up directory (SP61). If the judgment is negative, the CPU 21 selects one file or directory in the look-up directory; reads the metadata 84 (FIG. 7) for the selected file or directory from the storage subsystem 5; and judges whether or not the selected one is a file based on the metadata 84 (SP62).

If the judgment in step SP62 is negative, the CPU 21 switches the look-up directory from the current directory to the one selected in step SP62 (SP67); and returns to step SP61.

Meanwhile, if the judgment in step SP62 is positive, the CPU 21 judges whether or not the target user has a read right for the file based on the access right information 90D (FIG. 7) contained in the metadata 84 (SP63).

If the judgment in step SP63 is negative, the CPU 21 returns to step SP61, whereas if the judgment is positive, it judges whether or not the owner of the file is the target user (SP64). If the judgment is positive, the CPU 21 proceeds to step SP66, whereas if the judgment is negative, it sends the metadata numbers and directory names of the directories present in the path from the root directory to the file to the backup server 7. Consequently, the backup server 7 creates a virtual directory entry 33 (FIG. 10) based on the metadata numbers and directory names of the directories present in the path from the root directory and the file (FIG. 10) (SP65).

The CPU 21 then sends the data for the file to the backup server 7 (SP66). As a result, the data for the file and the data for the virtual directory entry 33 created in step SP65 are recorded in the magnetic tape by the tape apparatus 8, and the data for the file is backed up. The CPU 21 then returns to step SP61 and repeats the same steps (SP61-SP66-SP61).

Meanwhile, if the judgment in step SP61 is positive, the CPU 21 judges whether or not the current look-up directory is the root directory, based on the respective directory entries read from the storage subsystem 5 (SP68).

If the judgment in step SP68 is negative, the CPU 21 switches the look-up directory from the current directory to the one on the level immediately above (SP69). It then repeats the same steps (SP61-SP69-SP61) until it has performed the judgment in step SP62 for all the files belonging to the file system 42.

If the judgment in step SP68 is positive in the end, the CPU 21 terminates this virtual tree backup processing according to Embodiment 2.

With the foregoing configurations, backup of data in the file system 42 is performed by checking, for each file present in the file system 42, whether or not the target user has an access right for it; and backing up the data for the files the user has access rights for. Accordingly, it is possible to back up all the files the user has access rights for without missing any. Accordingly, a virtual tree the same as the one in Embodiment 1 can be created to back up the data.

(3) Other Embodiments

The foregoing embodiments were explained for the case where this invention is employed in a storage system 1 having the configuration shown in FIG. 1; however, this invention is not limited to this case and may be widely employed in storage systems having other various kinds of configurations.

The foregoing embodiments were also explained for the case where a file server 4 is provided and the file system function according to the embodiments is employed in this file server 4, however, the file system function may alternatively employed in the storage subsystem 5.

The foregoing embodiments were also explained for the case where an identification unit and a restoration unit are integrated in one CPU 21; the identification unit identifies the owner of each file and directory belonging to a backup virtual tree when restoring the backup virtual tree; and the restoration unit compares, when it is found that the owner of a backup file or directory is not a target user based on the result of the identification by the identification unit, the update time and version of the backup file or directory with those of the corresponding present file or directory, and when at least one of the update time and version of the backup file or directory is older than that of the corresponding present file or directory, restoring the backup file or directory into a special directory accessible for the target user while maintaining the tree structure of the original virtual tree. However, this invention is not limited to this case and the identification unit and restoration unit may alternatively be separately provided.

This invention can be widely applied in storage systems with various kinds of structures with file system functions.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. An information processing apparatus comprising:
a processor configured to create a virtual file system tree including a plurality of files and directories that are accessible by a target user and are belonging to a file system, copy the plurality of files and directories that are accessible by the target user to a backup server coupled to the information processing apparatus, and determine whether the target user is an owner of each of the plurality of files and directories that are copied to the backup server,
wherein when the target user is not the owner of a file or directory among the plurality of files and directories that are copied to the backup server and the update time and/or version of the backup file or directory is older than that of the corresponding present file or directory, the processor creates a special directory under a home directory of the target user and restores the file or directory whose owner is not the target user into the special directory that is accessible by the target user while maintaining the tree structure of the original virtual tree; and
wherein when the target user is the owner of the file or directory among the plurality of files and directories that are copied to the backup server, the processor restores the file or directory whose owner is the target user into the home directory.

2. The information processing apparatus according to claim 1, wherein when the update time and/or version of the backup file or directory is older than that of the corresponding present file or directory, the processor restores the backup file or directory back into a special directory accessible by the target user, while adding the path name of the special directory at the top of the path name of the file or directory.

3. The information processing apparatus according to claim 1, wherein the special directory is a previously set directory.

4. The information processing apparatus according to claim 1, wherein when the owner of the file or directory is the target user, the processor overwrites the data in the corresponding present file or directory with the data of the backup file or directory.

5. The information processing apparatus according to claim 1, wherein when the owner of the file or directory is not the target user and the update time and/or version of the backup file or directory is the same as that of the corresponding present file or directory, the processor does nothing for the file or directory.

6. The information processing apparatus according to claim 1, wherein the processor comprises a table for managing the files and directories whose update times and/or versions of their backups are older than those of the present files and directories.

7. An information processing method implemented by a processor, comprising:
creating a virtual file system tree including a plurality of files and directories that are accessible by a target user and are belonging to a file system;
copying the plurality of files and directories that are accessible by the target user to a backup server coupled to the information processing apparatus; and
determining whether the target user is an owner of each of the plurality of files and directories that are copied to the backup server,
wherein when the target user is not the owner of a file or directory amen the plurality of files and directories that are copied to the backup server and the update time and/or version of the file or directory is older than that of the corresponding present file or directory, creating a special directory under a home directory of the target user and restoring the file or directory whose owner is not the target user into the special directory that is accessible by the target user while maintaining the tree structure of the original virtual tree, and
wherein when the target user is the owner of the file or directory among the plurality of files and directories that are copied to the backup server, restoring the file or directory whose owner is the target user into the home directory.

8. The information processing method according to claim 7, wherein when the update time and/or version of the backup file or directory is older than that of the corresponding present file or directory, restoring the backup file or directory back into a special directory accessible by the target user, while the path name of the special directory is added at the top of the path name of the backup file or directory.

9. The information processing method according to claim 7, wherein the special directory is a previously set directory.

10. The information processing method according to claim 7, wherein when the owner of the file or directory is the target user, overwriting the data in the corresponding present file or directory with the data of the backup file or directory.

11. The information processing method according to claim 7 wherein when the owner of the file or directory is not the target user and the update time and/or version of the backup file or directory is the same as that of the corresponding present file or directory, performing no operation for the file or directory.

* * * * *